(12) United States Patent
Cui et al.

(10) Patent No.: US 11,042,760 B2
(45) Date of Patent: Jun. 22, 2021

(54) MOBILE ROBOT, CONTROL METHOD AND CONTROL SYSTEM THEREOF

(71) Applicants: ANKOBOT (SHENZHEN) SMART TECHNOLOGIES CO., LTD., Guangdong (CN); ANKOBOT (SHANGHAI) SMART TECHNOLOGIES CO., LTD., Shanghai (CN)

(72) Inventors: Yuwei Cui, Shanghai (CN); Chongxing Li, Shanghai (CN)

(73) Assignee: ANKOBOT (SHANGHAI) SMART TECHNOLOGIES CO., LTD., Shanghai (CN)

(*) Notice: Subject to any disclaimer, the term of this patent is extended or adjusted under 35 U.S.C. 154(b) by 0 days.

(21) Appl. No.: 15/929,934

(22) Filed: May 29, 2020

(65) Prior Publication Data
US 2021/0049376 A1 Feb. 18, 2021

Related U.S. Application Data

(63) Continuation of application No. PCT/CN2019/100636, filed on Aug. 14, 2019.

(51) Int. Cl.
*G06K 9/00* (2006.01)
*G06K 9/32* (2006.01)
(Continued)

(52) U.S. Cl.
CPC ....... *G06K 9/00805* (2013.01); *G05D 1/0238* (2013.01); *G06K 9/3241* (2013.01);
(Continued)

(58) Field of Classification Search
CPC ............ G06K 9/00805; G06K 9/3241; G06K 9/4604; G06T 7/564; G06N 20/00; G05D 1/0238
See application file for complete search history.

(56) References Cited

U.S. PATENT DOCUMENTS

2017/0305010 A1* 10/2017 Fong .................. B25J 9/1697
2018/0246518 A1* 8/2018 Vogel ................. G05D 1/0225
(Continued)

FOREIGN PATENT DOCUMENTS

CN      107092252 A     8/2017
CN      108170137 A     6/2018
(Continued)

OTHER PUBLICATIONS

Written Opinion issued on International Application PCT/CN2019/100636 dated May 22, 2020, 6 pages.

*Primary Examiner* — Ruiping Li
(74) *Attorney, Agent, or Firm* — Leber IP Law; David C. Robertson

(57) ABSTRACT

The present application provides a mobile robot, a control method and control system of the mobile robot. The control method comprises the following steps: acquiring a depth image obtained through photography of the at least one image acquisition device; wherein, the depth image contains a depth image of the target obstacle; identifying an obstacle type of the target obstacle from the depth image; controlling a navigation movement and/or behavior of the mobile robot based on an acquired positional relationship between the target obstacle and the mobile robot, and the identified obstacle type. In the present application, the type of the target obstacle can be detected effectively, and the behavior of the mobile robot can be controlled based on the detection result correspondingly.

19 Claims, 6 Drawing Sheets

(51) Int. Cl.
*G06K 9/46* (2006.01)
*G05D 1/02* (2020.01)
*G06N 20/00* (2019.01)
*G06T 7/564* (2017.01)

(52) U.S. Cl.
CPC ........... *G06K 9/4604* (2013.01); *G06N 20/00* (2019.01); *G06T 7/564* (2017.01); *G05D 2201/0203* (2013.01); *G06T 2207/10024* (2013.01); *G06T 2207/10028* (2013.01); *G06T 2207/30261* (2013.01)

(56) References Cited

U.S. PATENT DOCUMENTS

2019/0392630 A1* 12/2019 Sturm .................... G06T 17/00
2020/0069134 A1* 3/2020 Ebrahimi Afrouzi ....................... A47L 11/4041

FOREIGN PATENT DOCUMENTS

| CN | 207696519 U | 8/2018 |
| CN | 108803588 A | 11/2018 |
| CN | 109048926 A | 12/2018 |
| CN | 109330504 A | 2/2019 |
| CN | 109363571 A | 2/2019 |
| CN | 109363578 A | 2/2019 |
| CN | 109740443 A | 5/2019 |
| CN | 109814564 A | 5/2019 |
| WO | 2018186583 A1 | 10/2018 |

* cited by examiner

_US 11,042,760 B2_

MOBILE ROBOT, CONTROL METHOD AND CONTROL SYSTEM THEREOF

RELATED APPLICATION

This application is a continuation application of International Patent Application No. PCT/CN2019/100636, filed Aug. 14, 2019, the entire contents of which are hereby incorporated by reference.

TECHNICAL FIELD

The present application relates to the technical field of mobile robots, in particular to a mobile robot, a control method and control system of the mobile robot.

BACKGROUND

A mobile robot is a machine which can work automatically. The mobile robot can be operated under the command of human operators or in pre-programmed programs, and according to principles set out by the artificial intelligence technology as well. This type of mobile robot can be used indoors or outdoors, and can be used in industry, business or household. For example, the mobile robot can be used to replace security guards to perform patrol, or replace a greeter or an order taker, or replace people to clean the surface. The mobile robot can also be used to accompany family members or assist in doing office work or the like.

When the mobile robot such as autonomous cleaning robot, accompanying robot, and greeter robot moves under a working mode, because of the complexity of the working environment, the mobile robot often bumps into obstacle due to poor obstacle avoidance performance so as to damage furniture and itself during work, thus the normal working of the mobile robot is affected. Especially for some entanglement-type obstacles (such as cables, ropes, ribbons, odd bits of cloth, etc.), these often entangle wheels of the mobile robot, so that the mobile robot cannot move, and even, the mobile robot may fall onto the ground and cause a safety accident. For an autonomous cleaning robot, entanglement-type obstacles are more likely to entangle a cleaning system of the autonomous cleaning robot, such as entangling a side brush or a roller brush, entangling or clogging a dust suction component, etc. However, in the prior art, there are some defects in detecting obstacles by the mobile robot during work, and in particular, the mobile robot cannot detect some entanglement-type obstacles effectively.

Thus, in the existing mobile robot, it is an urgent problem to be solved in effective detection for the obstacle type.

SUMMARY

In view of the aforementioned shortcomings in the prior art, the present application provides a mobile robot and a control method and control system thereof, so that the obstacle type can be effectively detected.

In one aspect, the present application provides a mobile robot, the mobile robot comprises: at least one image acquisition device, configured to capture at least one image with a target obstacle; a movement device, configured to perform a moving operation in a controlled manner; a storage device, configured to store at least one program; a processing device, connected with the movement device, the storage device and the image acquisition device, and configured to invoke and execute the at least one program to coordinate the movement device, the storage device and the image acquisition device to perform and realize a control method as follows: acquiring a depth image obtained through photography of the at least one image acquisition device; wherein, the depth image contains a depth image of the target obstacle; identifying an obstacle type of the target obstacle from the depth image; controlling a navigation movement and/or behavior of the mobile robot based on an acquired positional relationship between the target obstacle and the mobile robot, and the identified obstacle type.

In some embodiments, the step of acquiring a depth image obtained through photography of the at least one image acquisition device comprises the following step: acquiring the depth image from an image acquisition device with a built-in depth sensor; or obtaining the depth image based on two color images captured by at least one image acquisition device, the two color images contain an overlapping area.

In some embodiments, the processing device further configured to perform at least one of the following steps: identifying a moving plane feature in the depth image, and determining a target image area in the depth image based on the moving plane feature; determining the target image area in the depth image based on a moving plane image area, the moving plane image area is preset based on an assembly angle of the image acquisition device; wherein the image of the target obstacle is located in the target image area.

In some embodiments, the step of identifying an obstacle type of the target obstacle from the depth image comprises at least one of the following steps: identifying an image feature of the target obstacle in the depth image, and determining the obstacle type according to the identified image feature of the target obstacle; performing obstacle classification on the depth image by a classifier trained through machine learning to obtain the obstacle type of the target obstacle characterized by the depth image.

In some embodiments, the image feature comprises a contour feature and/or a shape feature.

In some embodiments, the step of determining the obstacle type according to the identified contour feature of the target obstacle comprises: performing a statistic on contour width and/or height for the contour feature of the target obstacle; determining that the obstacle type of the target obstacle is an entanglement type when a statistical result for the contour width and/or height conform(s) to a preset first entanglement condition.

In some embodiments, the step of determining the obstacle type according to the identified shape feature of the target obstacle comprises: analyzing a curve shape feature of the target obstacle obtained through fitting based on a preset second entanglement condition; determining that the obstacle type of the target obstacle is an entanglement type according to the analyzed result.

In some embodiments, the processing device further configured to perform a step of acquiring a color image with the same target obstacle; the step of identifying an obstacle type of the target obstacle from the depth image comprises: identifying the obstacle type of the target obstacle based on the image of the target obstacle characterized by the depth image and an image of the target obstacle characterized by the color image.

In some embodiments, the step of identifying the obstacle type of the target obstacle based on the image of the target obstacle characterized by the depth image and an image of the target obstacle characterized by the color image comprises: matching a first image feature in the color image and a second image feature in the depth image; identifying the obstacle type of the target obstacle based on the image of the target obstacle obtained from the matched first image feature or second image feature.

In some embodiments, the processing device further configured to perform at least one of the following steps of obtaining target image areas in the color image and the depth image, to perform the matching operation in the target image areas: determining target image areas in the color image and the depth image based on a moving plane image area, the moving plane image area is preset based on an assembly angle of the image acquisition device; identifying a moving plane feature in the color image or/and the depth image, and determining target image areas in the color image and the depth image based on the identified moving plane feature.

In some embodiments, the step of matching a first image feature in the color image and a second image feature in the depth image comprises: determining the first image feature in the color image and the second image feature in the depth image are matched according to a preset overlapping condition.

In some embodiments, the step of identifying the obstacle type of the target obstacle based on the image of the target obstacle obtained from the matched first image feature or second image feature comprises at least one of the following steps: identifying the obstacle type of the target obstacle based on a contour feature of the target obstacle characterized by the matched first image feature or second image feature; identifying the obstacle type of the target obstacle based on a shape feature of the target obstacle characterized by the matched first image feature or second image feature; performing classification on an image area occupied by the matched first image feature or second image feature by a classifier trained through machine learning to obtain the obstacle type of the target obstacle in the image area.

In some embodiments, the step of identifying the obstacle type of the target obstacle based on a contour feature of the target obstacle characterized by the matched first image feature or second image feature comprises: performing a statistic on contour width and/or height for the contour feature of the target obstacle; determining that the obstacle type of the target obstacle is an entanglement type when a statistical result for the contour width and/or height conforms to a preset third entanglement condition.

In some embodiments, the step of identifying the obstacle type of the target obstacle based on a shape feature of the target obstacle characterized by the matched first image feature or second image feature comprises: analyzing a curve shape feature of the target obstacle obtained through fitting based on a preset fourth entanglement condition; determining that the obstacle type of the target obstacle is an entanglement type according to the analyzed result.

In some embodiments, the obstacle type includes at least one of an entanglement type, an island type, and a space separation type.

In some embodiments, the step of controlling a navigation movement and/or behavior of the mobile robot based on an acquired positional relationship between the target obstacle and the mobile robot, and the identified obstacle type comprises at least one of the following steps: in the case where the obtained obstacle type is an entanglement type, controlling the mobile robot to change its moving direction when being close to the target obstacle; in the case where the obtained obstacle type is an island type, controlling the mobile robot to bypass a corresponding target obstacle based on a relative positional relationship between the corresponding target obstacle and the mobile robot; in the case where the obtained obstacle type is a space separation type, controlling the mobile robot to slow down when being close to the target obstacle until contact with the target obstacle based on a relative positional relationship between the target obstacle and the mobile robot.

In some embodiments, the mobile robot is an autonomous cleaning robot.

In some embodiments, the step of controlling a navigation movement and/or behavior of the mobile robot based on an acquired positional relationship between the target obstacle and the mobile robot, and the identified obstacle type further comprises: in the case where the obtained obstacle type is an entanglement type, controlling the mobile robot to pass the target obstacle according to a preset movement route; and controlling a working state of at least one of a side brush, a roller brush and a fan in the mobile robot to be changed during passing the target obstacle.

In another aspect, the present application provides a control method for a mobile robot, wherein, the mobile robot comprises at least one image acquisition device, the control method comprises the following steps: acquiring a depth image obtained through photography of the at least one image acquisition device; wherein, the depth image contains a depth image of the target obstacle; identifying an obstacle type of the target obstacle from the depth image; controlling a navigation movement and/or behavior of the mobile robot based on an acquired positional relationship between the target obstacle and the mobile robot, and the identified obstacle type.

In yet another aspect, the present application provides a control system for a mobile robot, wherein, the mobile robot is provided with at least one image acquisition device, the control system comprises: an interface device, configured to receive an image captured by the at least one image acquisition device; a storage device, configured to store at least one program; a processing device, connected with the interface device and the storage device, and configured to invoke and execute the at least one program to coordinate the interface device, the storage device and the image acquisition device to perform and realize a control method as follows: acquiring a depth image obtained through photography of the at least one image acquisition device; wherein, the depth image contains a depth image of the target obstacle; identifying an obstacle type of the target obstacle from the depth image; controlling a navigation movement and/or behavior of the mobile robot based on an acquired positional relationship between the target obstacle and the mobile robot, and the identified obstacle type.

As described above, in the mobile robot and the control method and control system thereof disclosed in the present application, a depth image obtained through photography of at least one image acquisition device is acquired, and an obstacle type of the target obstacle is identified based on the depth image, thus the problem that the false detection is liable to occur due to sticker and carpet pattern and the like cannot be identified in the color image can be solved effectively; and based on a positional relationship between the target obstacle and the mobile robot provided by the depth image, and the identified obstacle type, a navigation movement and/or behavior of the mobile robot can be effectively controlled to prevent various obstacle types from hindering the behavioral operation and navigation movement of the mobile robot.

DETAILED DESCRIPTION

Figure 1:
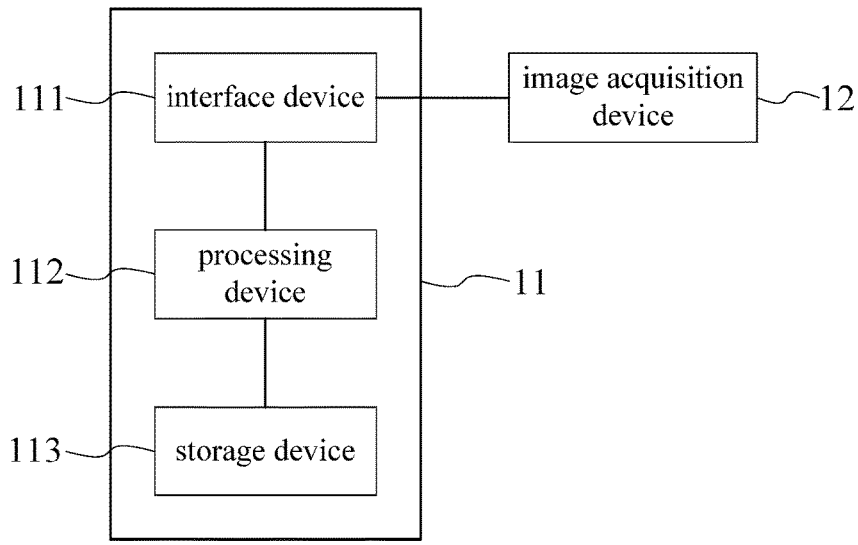
FIG. 1 shows a block diagram of a hardware structure of a control system of a mobile robot of the present application.

Implementations of the present application will be described below through specific embodiments, and those skilled in the art can easily understand other advantages and effects of the present application from the contents disclosed in the present specification.

In the following description, several embodiments of the present application are described with reference to the attached figures. It should be understood that other embodiments may also be used, and changes of mechanical composition, structure, electric and operation may be made without departing from the spirit and scope of this application. The following detailed description should not be considered restrictive, and the scope of the implementation of this application is limited only by the published patent claims. The terminology used herein is intended only to describe specific embodiments and is not intended to restrict this application. Spatial terms, such as "up", "down", "left", "right", "lower part", "higher part", "bottom", "below", "above", "upwards", etc., can be used in this application to illustrate the relationship between one element and another or one feature and another shown in the figure.

In addition, the terms "first", "second", etc. are used herein to describe various elements in some examples, these elements should not be limited by these terms. These terms are only used to distinguish one element from another. For example, a first image feature may be referred to as a second image feature, and similarly, a second image feature may be referred to as a first image feature without departing from the scope of the various embodiments. Both the first image feature and the second image feature are characterizing an image feature, but unless the context clearly indicates otherwise, they are not the same image feature. Similar situations include the first entanglement condition and the second entanglement condition.

Moreover, as used herein, such single forms as "one", "a" and "the" aim at also including the plural forms, unless contrarily indicated in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

The present application relates to the field of mobile robots. A mobile robot is a machine which can work automatically. The mobile robot can be operated under the command of human operators or in pre-programmed programs, and according to principles set out by the artificial intelligence technology as well. This type of mobile robot can be used indoors or outdoors, and can be used in industry, business or household. For example, the mobile robot can be used to replace security guards to perform patrol, or replace a greeter or an order taker, or replace people to clean the surface. The mobile robot can also be used to accompany family members or assist in doing office work or the like. Taking the most common autonomous cleaning robot as an example, the autonomous cleaning robot also known as automatic sweeping machine, intelligent vacuum cleaner or the like, which is a type of intelligent household appliance that can perform sweeping, dust collection, floor mopping and other cleaning work. Specifically, the autonomous cleaning robot performs a ground cleaning task in the room under the control of a person (an operator holding a remote control) or autonomously according to certain set rules.

Due to the complexity of the working environment, the mobile robot is likely to encounter various obstacles when moving under a working mode. Therefore, it is a necessary skill for mobile robots to detect obstacles in time and adjust its behavior correspondingly. Moreover, in the prior art, there are some defects in detecting obstacles by the mobile robot during operation, especially there are blind spots in detecting some entanglement-type obstacles. Taking an autonomous cleaning robot as an example, for example, when the autonomous cleaning robot performs cleaning operation indoors, entanglement type obstacles (such as cables, ropes, ribbons, etc.) on the ground cannot be detected through conventional infrared ranging detection or ultrasonic ranging detection easily. If the autonomous cleaning robot does not perform corresponding behavioral control, the entanglement-type obstacles may entangle wheels of the autonomous cleaning robot, so that the mobile robot cannot move, and even, the autonomous cleaning robot may fall onto the ground and cause a safety accident, and the obstacles may also entangle a cleaning system of the autonomous cleaning robot, such as entangling a cleaning brush, entangling or clogging a dust suction component, etc., so that the autonomous cleaning robot cannot perform the cleaning work.

Based on the above-described example of the autonomous cleaning robot and spreading to mobile robots used in other application scenarios that can autonomously move based on a map constructed in advance, such as home companion mobile robots, autonomous cleaning robots, patrol mobile robots, and other robots, in order to detect the type of obstacle effectively, and control the navigation movement, behavior of the mobile robot correspondingly according to the detection result of the obstacle type, the present application provides a control method for a mobile robot. The control method is used in the mobile robot, such that the mobile robot identifies an obstacle type in the image according to a depth image captured by an image acquisition device, and controls the navigation movement, behavior, and the like of the mobile robot based on the obstacle type, thus the situation that the mobile robot cannot move, cannot work or fall on the ground or the like in the working state result from being not identify the obstacle type timely and effectively can be avoided.

Here, the mobile robot is provided with at least one image acquisition device (such as camera) and a movement device. The image acquisition device is a device for providing a two-dimensional or three-dimensional image according to a preset pixel resolution. In each three-dimensional image, depth data obtained based on preset pixel position is used to represent an obstacle image within the field of view, wherein the depth data of each pixel in each three-dimensional image includes: angle information and distance information between each pixel point and an obstacle measurement point which are determined based on position of each pixel in the three-dimensional image. In each two-dimensional image, color data obtained based on preset pixel position is used to represent an obstacle image within the field of view, wherein the color data of each pixel position in each two-dimensional image includes: grayscale data, R data, G data, B data, RGB data, etc. The two-dimensional image is, for example, a Bayer image, or an RGB image, or a grayscale image or the like.

Here, the image acquisition device includes, but is not limited to, an image acquisition device including a CCD, an image acquisition device including a CMOS, an image acquisition device including an area array depth measurement unit, an image acquisition device (e.g. ToF sensor) integrated with an area array depth measurement unit and an infrared sensor, and the like.

The mobile robot performs the control method by a control system provided therein. Please refer to FIG. 1, which shows a block diagram of a hardware structure of a control system of the mobile robot. The control system 11 includes an interface device 111, a storage device 113, and a processing device 112.

According to the image acquisition device 12 actually provided in the mobile robot, the interface device 111 is connected with at least one image acquisition device 12, and is used for reading, from the corresponding image acquisition device 12, a depth image containing an obstacle image in a direction of movement captured by the image acquisition device. The interface device 111 includes, but is not limited to, a serial interface such as an HDMI interface or a USB interface, or a parallel interface or the like.

The storage device 113 is configured to store at least one program, the at least one program is used for the processing device to perform the control method of the mobile robot. The storage device 113 also stores obstacle types and control strategies thereof, wherein the control strategy is used for controlling a navigation movement and/or behavior of the mobile robot. In practical applications, a navigation movement control strategy in the control strategy is set according to a map application constructed according to SLAM and stored by the storage device 113. For example, the map application includes a movement control strategy determined based on a relative positional relationship between the positioned mobile robot and each obstacle type. A behavior control strategy in the control strategy is set according to a behavior application that the mobile robot can provide. For example, the mobile robot is an autonomous cleaning robot, and the corresponding behavior control strategy includes a cleaning behavior application set based on the obstacle type.

The storage device 113 includes, but is not limited to, a read-only memory (ROM), a random access memory (RAM), and a nonvolatile memory (NVRAM). For example, the storage device includes a flash memory device or other nonvolatile solid state storage device. In some embodiments, the storage device also includes a storage away from one or more processing devices, such as a network attached storage accessed via an RF circuit or external port and a communication network, wherein the communication network is the internet, one or more intranets, local area networks (LAN), wide area networks (WLAN), storage area networks (SAN), etc., or any suitable combination thereof. The storage device also includes a storage controller that controls access to the storage by a central processing unit (CPU) and an interface device and the like or other components of the mobile robot.

The processing device 112 is connected with the interface device 111 and the storage device 113. The processing device 112 includes one or more processors. The processing device 112 operatively performs data read and write operations with the storage device. The processing device 112 performs operations such as extracting images, temporarily storing features, locating the robot in a map based on features, and the like. The processing device includes one or more general purpose microprocessors, one or more dedicated processors (ASIC), one or more digital signal processors (DSP), one or more field programmable logic arrays (FPGA), or any combination thereof. The processing device 112 is also operatively coupled with an I/O port and an input structure, wherein the I/O port enables the mobile robot to interact with various other electronic devices, and the input structure enables a user to interact with a computing device. Thus, the input structure includes a button, a keyboard, a mouse, a touchpad, etc. The other electronic devices include, but are not limited to, a mobile motor in the movement device of the mobile robot, or a slave processor in the mobile robot specifically for controlling the movement device and the cleaning device, such as a microcontroller unit (MCU).

Figure 2:
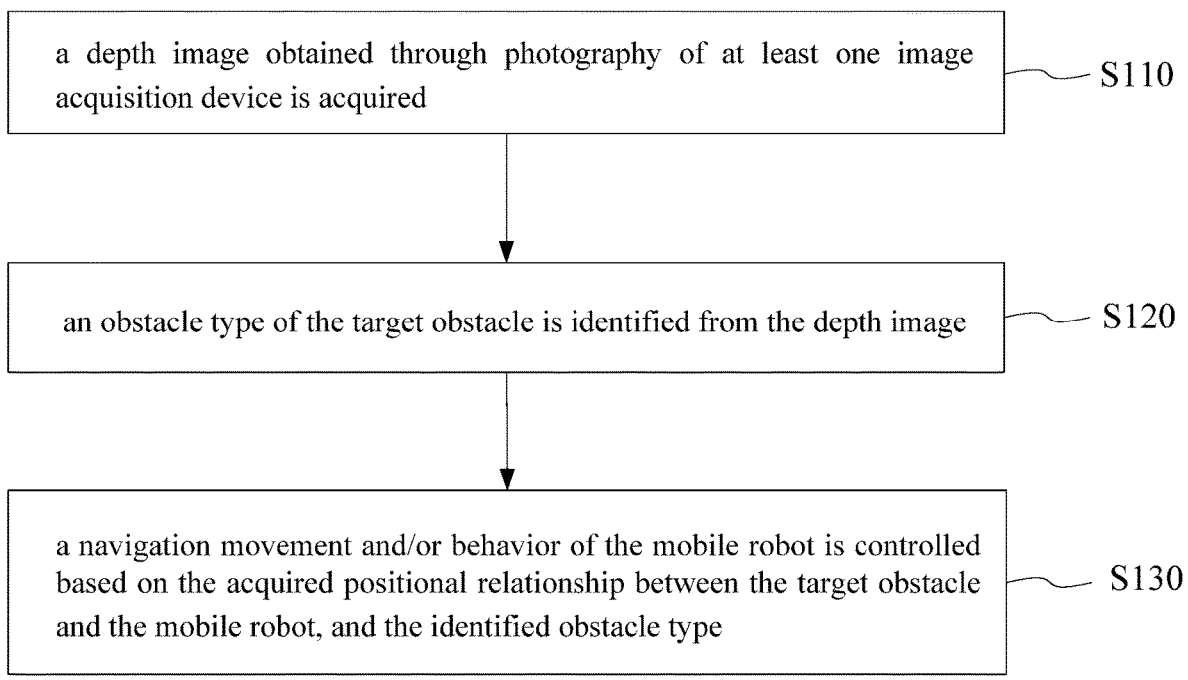
FIG. 2 shows a flow diagram of a control method for a mobile robot of the present application in an embodiment.

Please refer to FIG. 2, which shows a flow diagram of a control method for a mobile robot of the present application in an embodiment. The control method can be executed by the processing device included in the mobile robot.

In step S110, a depth image obtained through photography of at least one image acquisition device is acquired, wherein the depth image contains an image with a target obstacle.

The depth image is also referred to as a distance image, which indicates an image in which the distance between each pixel point of the depth image and an actual measurement point of the captured corresponding obstacle is used as a pixel value. Wherein, the deflection angle between each pixel point and the corresponding measurement point is determined based on set parameters of the image acquisition device. The depth image directly reflects the geometry of the visible surface of each obstacle in the captured physical scenario. The depth image can be converted into spatial point cloud data by coordinate conversion. Each obstacle described by the depth data in the depth image can be used as the image of the target obstacle and can be identified for subsequent processing.

The target obstacle refers to an object temporarily placed on the moving plane and an object that is not easy to move. According to the actual application environment, the moving plane includes but is not limited to the following categories: cement ground, painted ground, ground with a composite floor, ground with a solid wood floor, ground with a carpet, a table top, a glass surface, and the like. Examples of the object temporarily placed on the moving plane include: shoes, socks, pet feces, chairs, cables, and the like. Examples of the object that is not easy to move include: wardrobes, bookshelves, walls, stairs, and the like.

Figure 3:
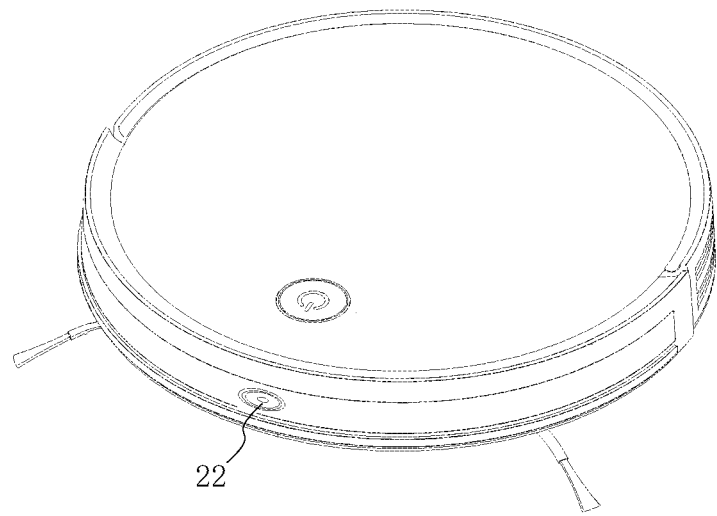
FIG. 3 shows a schematic diagram of a hardware structure of a mobile robot as an autonomous cleaning robot of the present application in an embodiment.

In an embodiment, the processing device acquires the depth image from an image acquisition device with a built-in depth sensor. Please refer to FIG. 3, which shows a schematic diagram of a hardware structure of a mobile robot as an autonomous cleaning robot in an embodiment. A body side of the mobile robot is provided with an image acquisition device 22 including an area array depth sensor. The image acquisition device 22 can also be disposed at other position where the mobile robot can obtain the depth image in the direction of movement, for example, at an edge of the top surface of the mobile robot. The processing device is connected with the image acquisition device 22 including the area array depth sensor via an interface device (not shown) to obtain the depth image.

The depth sensor is a depth sensor that can capture depth information of each pixel point constituting a two-dimensional plane, and the depth sensor includes an area array-based depth measurement sensor, a dot array-based depth measurement sensor, the depth sensor includes but is not limited to: a lidar sensor, a flight time-based depth sensors, a depth sensors based on structured light technology, etc. For example, the depth sensor includes an light emitter and a light receiving array, wherein the light emitter projects a particular optical signal to the surface of the object, and then the optical signal is reflected to the light receiving array. The light receiving array calculates information such as the position and depth of the object according to the change of the optical signal caused by the object to obtain three-dimensional depth information of the object.

In another embodiment, the processing device obtains the depth image based on two color images with an overlapping area captured by at least one image acquisition device, wherein the color images may be grayscale images or RGB images. It should be noted that the two color images may both be grayscale images or RGB images, or one is a RGB image and the other is a grayscale image.

Figure 4:
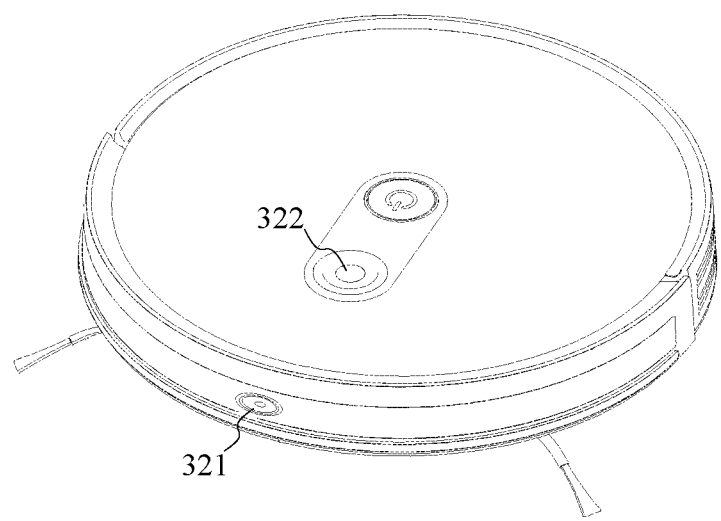
FIG. 4 shows a schematic diagram of a hardware structure of a mobile robot as an autonomous cleaning robot of the present application in another embodiment.

In an embodiment, the mobile robot is provided with a single image acquisition device such as camera for photographing color images. Alternatively, referring to FIG. 4, which shows a schematic diagram of a hardware structure of a mobile robot as an autonomous cleaning robot in another embodiment, The mobile robot is provided with a plurality of image acquisition devices (321, 322), wherein one image acquisition device 321 is configured to provide color images for the control method in the present application.

The processing device is connected with the single image acquisition device via an interface device, and acquires color images captured at different time by the image acquisition device with a preset time interval, wherein the captured two color images include an overlapping field of view, and the processing device performs three dimensional reconstruction on a depth image of the obstacle in the overlapping field of view in advance based on the two color images and a physical distance and deflection angle that the robot moves within the time interval. Here, the time interval may be greater than or equal to a time interval required for capturing an adjacent key frame image by the image acquisition device.

Here, for example, a manner that the processing device obtains the depth image corresponding to the overlapping area based on two color images containing the overlapping area is as follows, wherein, the two color images are captured by at least one image acquisition device at two moments during movement:

The processing device of the mobile robot records corresponding positions and poses of the mobile robot at time t1 and time t2 respectively: a position of the mobile robot in a moving plane at the time t1, a relative distance m between positions of the mobile robot at the time t2 and at the time t1, and a relative deflection angle of the mobile robot at the time t2 relative to at the time t1 is left rotation n degrees. Based on the length m, the angle n, and an image P1 taken at the time t1 and an image P2 taken at the time t2, etc., the processing device calculates the physical distance and the deflection angle between each pixel in the overlapping area of the images P1 and P2, and the position of the mobile robot at the time t1 or the position of the mobile robot at the time t2, to obtain the depth image corresponding to the overlapping area in the two color images.

Figure 5:
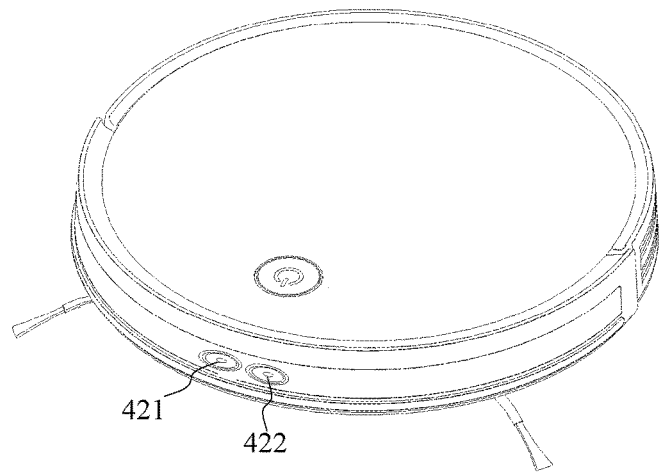
FIG. 5 shows a schematic diagram of a hardware structure of a mobile robot as an autonomous cleaning robot of the present application in yet another embodiment.

In another embodiment, referring to FIG. 5, which shows a schematic diagram of a hardware structure of a mobile robot as an autonomous cleaning robot in yet another embodiment, the mobile robot is provided with a binocular image acquisition device for photographing two color images simultaneously, the binocular image acquisition device includes two camera units 421, 422. Two camera units 421, 422 of the binocular image acquisition devices may be in the same or different types.

The top or a body side of the mobile robot is provided with the binocular image acquisition device that is used to synchronously photograph color images including an overlapping field of view, and the processing device is connected with the binocular image acquisition device via an interface device, and acquires the two color images that are taken synchronously. The processing device performs a three-dimensional reconstruction on depth images of all obstacles in the overlapping area of field of view based on the two color images and the physical distance between the two camera units in the binocular image acquisition device.

Figure 6:
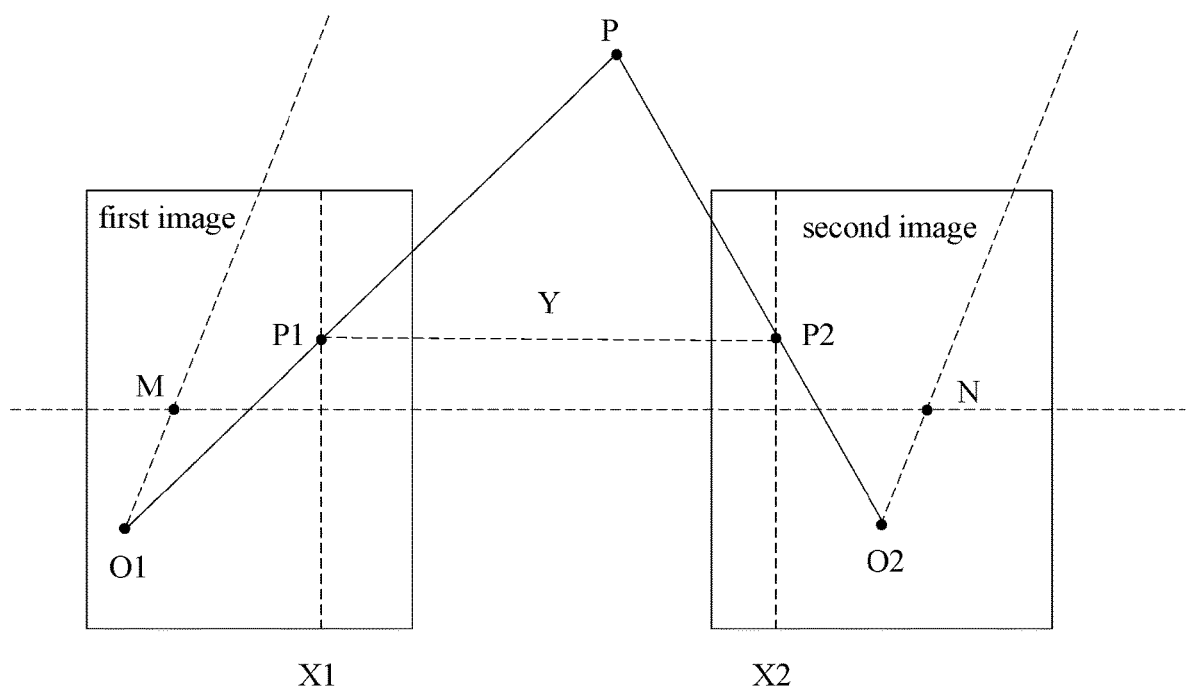
FIG. 6 shows a principle diagram of three-dimensional reconstruction on an object captured in two color images in an overlapping field of view.

Here, for example, a manner that the processing device obtains the depth image based on two color images containing the same target obstacle captured by two image acquisition devices at the current time is as follows:

Referring to FIG. 6, which shows a principle diagram of three-dimensional reconstruction on an object captured in two color images in an overlapping field of view, as shown, a first image and a second image are included in the figure, wherein the first image is an image captured by a first image acquisition device of the mobile robot, and the second image is an image captured by a second image acquisition device of the robot; and O1M represents an optic axis of the first image acquisition device, and O2N represents an optic axis of the second image acquisition device. P represents a point on the object in the overlapping area, P1 is a pixel area of the point P in the first image, and P2 is a pixel area of the point P in the second image. According to photographic parameters when the first image acquisition device and the second image acquisition device take the images, such as a focal length f, a distance B between optical centers, an angle of the pixel area relative to the optical axis, etc., trigonometric calculation is carried out to obtain a distance Z and angle between the point P and the mobile robot in the actual physical space.

The processing device can traverse each pixel point in the image areas corresponding to the overlapping field of view in the first image and the second image in the above manner to obtain a depth image including a target obstacle image.

In step S120, an obstacle type of the target obstacle is identified from the depth image.

According to the behavior control strategy, the obstacle type includes, but is not limited to, at least one of: an entanglement type, an island type, a space separation type, and the like. Among them, the entanglement type includes a type of obstacle that is liable to entangle a movement device (such as a roller) of the mobile robot or to entangle a cleaning device such as a side brush or a roller brush of the autonomous cleaning robot. For example, target obstacles with the entanglement type include, but are not limited to the following categories: cables, ropes, ribbons, shoelaces, odd bits of cloth, plant vines, and the like. Target obstacles with the island type include a type of obstacle that the mobile robot does not touch and can bypass, such as chairs, shoes, socks, pet feces, balls and the like described above Target obstacles with the space separation type include a type of obstacle for dividing a space to form different functional spaces, such as walls, doors, windows, wardrobes, screens, sofas, beds, and the like.

In some practical applications, the mobile robot needs to know the obstacle type of the target obstacle that hinders the movement and/or behavior operation to achieve autonomous avoidance, and at the same time, to reduce the amount of calculation when the processing device identifies the obstacle type of the target obstacle, the processing device also identifies a moving plane feature in the depth image.

In some examples, the processing device fits a spatial plane in the depth image according to position of each pixel point in the depth image and depth data described by the pixel point, wherein the processing device takes each pixel point which has a preset error threshold range with respect to the fitted spatial plane as a moving plane feature. For example, the preset error threshold range includes: a height value from the pixel point to the fitted spatial plane, or a variance or a standard deviation of the height value being within a preset threshold range. Taking the moving plane is the ground as an example, the moving plane feature is for example a ground plane feature, and height value z in three-dimensional coordinate (x, y, z) of each pixel point of the ground plane features is lower than height values of other pixel points.

The processing device determines a target image area in the depth image based on the identified moving plane feature, wherein the image of the target obstacle is located in the target image area.

Here, the processing device takes an image area formed by the obtained moving plane features as an image area corresponding to the moving plane, and takes an image area formed by other pixels in the depth image as an image area including a target obstacle image. In other words, the remaining portion of the depth image left after the identified moving plane features are removed from the depth image is the target image area, and the target image area includes the image of the target obstacle. The processing device identifies an obstacle type of the captured target obstacle from the target image area.

In some other examples, the target image area of the depth image is determined based on a moving plane image area preset according to an assembly angle of the image acquisition device. In some embodiments, taking the moving plane is the ground as an example, the moving plane feature refers to a ground plane feature, and the moving plane image area refers to a ground plane image area.

In some embodiments, the assembly angle of the image acquisition device may be any angle from 0° to 90°, wherein the angle refers to an angle between a horizontal line of the direction of movement of the robot and an optic axis or an optical axis of the image acquisition device.

For example, in an embodiment, in the case where the robot is a cleaning robot, the image acquisition device is assembled at a position on a front end face of the cleaning robot in the direction of movement, that is, the image acquisition device is assembled on a buffer assembly of the cleaning robot, and the optic axis of the image acquisition device is parallel to ground for moving, thus the angle is 0°, and the image acquisition device is, for example, a depth image acquisition device.

As another example, in another embodiment, in the case where the robot is a cleaning robot, the image acquisition device is assembled at a position on an upper surface (i.e. a surface perpendicular to the direction of movement) of the cleaning robot, and the optic axis of the image acquisition device is perpendicular to ground the for moving, thus the angle is 90°, and the image acquisition device is, for example, a fish-eye image acquisition device.

As yet another example, in yet another embodiment, in the case where the robot is a cleaning robot, the image acquisition device is assembled at a position on an upper surface (i.e. a surface perpendicular to the direction of movement) of the cleaning robot, but the image acquisition device is obliquely placed in a recessed structure, and the angle between the optic axis of the image acquisition device and the ground for moving is within the range of 10° to 80°; in a more preferred embodiment, the angle between the optic axis of the image acquisition device and the ground for moving is within the range of 30° to 60°; or alternatively, the optic axis of the image acquisition device which is obliquely placed is at an acute angle of 30° to 40° above the horizontal plane in line with the top surface of the cleaning robot, and the field of view of the image acquisition device spans a frustum of 45° to 65° in the vertical direction.

As still another example, in still another embodiment, in the case where the robot is a cleaning robot, the image acquisition device can be assembled in a manner as described in Chinese patent CN207696519U, which is incorporated herein in its entirety by reference.

Taking an example that the image acquisition device is assembled at a body side of the mobile robot, with its optic axis being parallel to the moving plane or with an angle with respect to the moving plane, for this, according to the assembly angle, and the response speed of the moving operation and behavior operation of the mobile robot, a preset depth threshold is stored in the storage device in advance, the processing device regards an image area in the captured depth image in which the depth data thereof is smaller than the depth threshold as a moving plane image area, and filters out the moving plane image area in the depth image to obtain the target image area.

The processing device performs an operation of identifying an obstacle type in the target image area of the depth image. In an embodiment, a manner of identifying an obstacle type of the target obstacle in the depth image by the processing device includes: identifying an image feature of the target obstacle in the depth image, and determining an obstacle type according to the identified image feature of the target obstacle. The image feature is a feature line, a feature point, and/or a combination thereof, which is characterized by the depth data and used for matching an obstacle type, and examples thereof include a contour feature, and/or a shape feature, etc. For example, a contour feature associated with an island type includes, but is not limited to, a spatial range formed by a closed contour line, and a local or global feature on a contour line of a typical island-type obstacle. As another example, a contour feature associated with an entanglement type includes, for example, the statistical contour width being not greater than a preset width threshold (e.g. not greater than 1 cm). As yet another example, a contour feature associated with a space separation type includes, for example, a straight line feature, a polygonal line feature, a straight line length conforming to the linear feature being greater than a preset threshold, etc.

The shape feature is a geometric shape, geometric shape combination or the like, which is formed or abstracted based on feature lines and/or feature points and is used for matching each obstacle type. The geometric shape and geometric shape combination can be represented based on the entire contour or a portion of the contour of the identified target obstacle. For example, the shape feature configured based on the island type includes a combination of one or more of: a circular shape, a spherical shape, an arc shape, a square shape, a cubic shape, a π shape, and the like. For example, a shape feature of a shoe includes a plurality of arc shapes connected end to end; and a shape feature of a chair includes a π shape, a claw shape, and the like. The shape feature configured based on the entanglement type includes a combination of at least one or more of: a curved shape, a serpentine shape, a coiled shape, and the like. The shape feature configured based on the space separation type includes a combination of at least one or more of: a straight line shape, a polygonal line shape, a rectangular shape, and the like.

The processing device identifies the obtained image features in the depth image according to feature rule corresponding to each preset obstacle type described above to obtain a corresponding obstacle type.

In a specific implementation, a manner of identifying an obstacle type of the captured target obstacle from the target image area includes: determining an obstacle type according to a contour feature of the target obstacle. Here, the processing device determines feature point or feature line located on the contour of the target obstacle in the depth image according to the discontinuity of the depth data of adjacent pixels, and determines a contour feature of the target obstacle based on the extracted feature point or feature line. The discontinuity of the depth data refers to that the difference between the depth data of adjacent pixels exceeds a preset threshold. The method for determining the feature point or feature line includes, but is not limited to, a scan line iterative method, a bidirectional curvature method, a differential operator method, and the like. Contour lines formed by feature points and/or the feature lines and used for describing edges of two sides of the target obstacle are regarded as the contour features. The contour feature also includes a feature which is extracted based on the obtained contour line and associated with an obstacle type.

Taking an example of identifying an entanglement-type obstacle, the step of determining an obstacle type according to the identified contour feature of the target obstacle performed by the processing device includes: performing a statistics on contour width and/or height for the contour feature of the target obstacle; determining that the obstacle type of the target obstacle is an entanglement type when a statistical result for the contour width and/or height conforms to a preset first entanglement condition.

Here, the processing device performs statistics on the shortest distance between two contour lines for describing edges of two sides of the target obstacle to obtain distribution of the contour width, that is, to obtain the contour width result. When the statistical contour width result conforms to the preset first entanglement condition, it is determined that the obstacle type of the target obstacle is an entanglement type. The first entanglement condition includes at least one of the following: the contour width results are concentrated at an interval in which the contour width is less than or equal to a preset width threshold (such as 1 cm, 0.95 cm, or 0.9 cm, etc.); at least one of a standard deviation, a variance and a mean of the contour width falls within a preset range. The first entanglement condition is not limited thereto.

Figure 7:
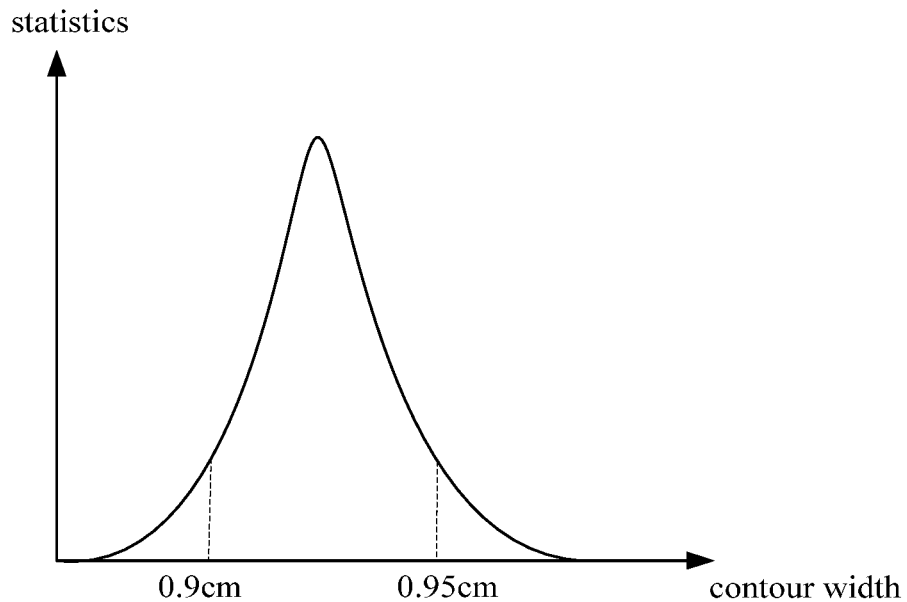
FIG. 7 shows a schematic diagram of contour width distribution obtained by performing contour width statistics on a target obstacle.

For example, referring to FIG. 7, which shows a schematic diagram of contour width distribution obtained by performing a contour width statistics on a target obstacle, as shown, the contour widths of the target obstacle are concentrated between 0.9 cm and 0.95 cm, and the mean of the contour width is less than a preset threshold of 1 cm, it is determined that the obstacle type of the target obstacle is an entanglement type. It should be noted that the settings of the width mean and the distribution condition are not limited thereto, and the preset conditions of the distribution condition and the contour width mean can be set according to actual conditions.

It should be noted that when the measured contour width is a distance between the contour edge of the target obstacle on the moving plane and the contour point of the target obstacle positioned higher than the moving plane, the contour width is also referred to a contour height (or height of the target obstacle). The processing device performs statistics on the contour height, and determines that the obstacle type of the target obstacle is an entanglement type when the statistical contour height result conforms to the preset first entanglement condition. For example, in a case of the moving plane is the ground, the contour height of the target obstacle is the distance between the contour edge of the target obstacle on the ground plane and the contour point of the target obstacle positioned higher than the ground plane, and for the distribution of the contour height, if the statistical contour heights are concentrated between 0.9 cm and 0.95 cm, and the mean of the contour height is less than a preset threshold of 1 cm, it is determined that the obstacle type of the target obstacle is an entanglement type.

It should also be noted that when statistics are performed on both contour height and contour width which indicates a contour width corresponding to other contour position of the target obstacle such as diameter, diagonal line, etc., the contour height and contour width are taken as different values, accordingly, the distribution of contour height and the distribution of contour are different.

In some more specific examples, to improve the accuracy of identifying an entanglement type, and reduce the computational load, the processing device filters out contour line with straight line feature, and/or target obstacle of which the lowest point of contour line is higher than the height of the mobile robot. The straight line feature includes: contour line whose length is greater than a preset length threshold, and whose curvature is less than a preset curvature threshold.

In another specific embodiment, the image feature is a shape feature, and the processing device determines an obstacle type of the target obstacle according to the shape feature of the target obstacle. Since the depth image is spatial point cloud data representing a spatial position, a shape feature characterizing the target obstacle can be fitted based on the spatial point cloud data of the target obstacle. For example, a mobile phone is placed on the ground, and a cuboid is obtained by fitting the spatial point cloud data described by the depth image, and based on the identification conditions for each obstacle type, it is determined that the space occupied by the cuboid is an island obstacle type.

Taking an example of identifying an entanglement-type obstacle, the processing device analyzes a curve shape feature of the target obstacle obtained through fitting based on a preset second entanglement condition; and determines that the obstacle type of the target obstacle is an entanglement type according to the analyzed result.

Here, the processing device fits the feature lines, feature points, and the like identified in the depth image by a curve fitting algorithm to obtain a spatial curve which describes the curve shape feature. The curve fitting algorithm includes, but is not limited to, a data fitting method adapted to a convexity-preserving requirement, or least squares data fitting method, etc. The processing device performs statistics on the shortest distance from the point on a contour line on one side of the identified target obstacle to the spatial curve, for example, performs statistics on the variance or the mean square deviation of each shortest distance, and if the obtained statistical result conforms to the preset second entanglement condition, it can be determined according to the analysis result that the obstacle type of the target obstacle is an entanglement type. The second entanglement condition includes that the statistical result is less than or equal to a preset threshold.

In another embodiment, obstacle classification is performed on the depth image by a classifier trained through machine learning to obtain an obstacle type of the target obstacle characterized by the depth image.

The classifier is configured to identify at least one of an entanglement type, an island type, a space separation type, and an unknown type in the depth image, and the position of the identified corresponding type of target obstacle in the depth image. To this end, the number of the classifier may be one or more. For example, multiple classifiers identify each type of obstacle correspondingly in a cascading manner. As another example, multiple classifiers identify each type of obstacle correspondingly in a parallel identification manner. As yet another example, a single classifier identifies multiple types of obstacles.

The classifier includes, for example, a trained convolutional neural network (CNN). The convolutional neural network is an architecture of a deep neural network, and is closely related to image processing. The weight-sharing network structure of the convolutional neural network makes it more similar to a biological neural network. Such structure not only reduces the complexity of a network model, but also reduces the number of weights. The network structure has feature invariance for image translation, scaling, tilting or other form of deformation.

The machine learning method includes, for example: training the classifier with a part of sample images to obtain parameters of each neural layer and parameters for connecting each neural layer; and performing back propagation on the obtained classifier with another part of the sample images to verify the probability about correct classification by the trained classifier, and when the obtained probability reaches a preset design threshold, a classifier for implantation into the mobile robot is obtained. To improve the probability of correct classification of the classifier, the sample images used for training include positive sample images and negative sample images. Each sample image is depth data.

In some embodiments, the machine learning process further includes performing corresponding image pre-processing on the sample image. The image pre-processing includes, but is not limited to, cropping, compressing, grayscale processing, image filtering, and/or noise filtering processing on the sample image. Correspondingly, the processing device performs image pre-processing on the depth image to be identified; and inputs the pre-processed depth image into the classifier to obtain an identification result. The process of image pre-processing on the depth image to be identified includes, but is not limited to, cropping, compressing, thresholding, image filtering, noise filtering processing on the depth image to be identified, and so on.

It should be noted that in some embodiments, the aforementioned classifier for identifying entanglement-type obstacles can be pre-stored in the storage device. In an embodiment, before the mobile robot is sold to the user (e.g. before the mobile robot leaves the factory, or before the mobile robot is delivered to each point of sale, or before the mobile robot is sold to the end user at the point of sale), the classifier is written into the storage device. In another embodiment, the classifier may also perform an update operation after the mobile robot is networked and establishes a communication connection with a corresponding manufacturer's server or application service provider's server. In still other embodiment, the classifier is stored in a server-side system that is in remote communication with the mobile robot. During image identification, the processing device may transmit the acquired at least one depth image to the server-side system, and the classifier in the server-side system identifies the image and feeds back the identification result to the processing device of the mobile robot.

When the obstacle type in the captured image is obtained through any of the above examples, a positional relationship between the target obstacle with the obstacle type and the mobile robot is obtained, and step S130 is performed. The aforementioned positional relationship includes a plurality of sets of distance and angle between a space occupied by the target obstacle and a space occupied by the mobile.

In step S130, a navigation movement and/or behavior of the mobile robot is controlled based on the acquired positional relationship between the target obstacle and the mobile robot, and the identified obstacle type.

The positional relationship may be obtained based on depth data of the target obstacle identified in the depth image and position of corresponding each pixel in the depth image. Combination with the depth data of the target obstacle in the depth image and measurement data obtained by other measurement sensors in the mobile robot at a corresponding angle, the positional relationship may be obtained according to respective weights thereof. The other measurement sensors include an angle sensor and a distance sensor, such as a laser sensor integrated with angle and distance measurements.

The processing device of the mobile robot controls a navigation movement and/or behavior of the mobile robot based on a preset control strategy corresponding to the identified obstacle type.

The manner of controlling a navigation movement of the mobile robot is, for example, as follows:

For a mobile robot that performs a moving operation by using a driving wheel, when passing a vine plant of an entanglement type for example, a ring formed by the vine plant may trap the wheel therein, or the uneven ground caused by the height of the vine plant may stumble the mobile robot. For this reason, in the case where the obtained obstacle type is an entanglement type, the processing device controls the mobile robot to change a moving direction when being close to the target obstacle;

Here, the processing device constructs a virtual wall for avoiding contacting the target obstacle according to the obtained relative positional relationship between the target obstacle and the mobile robot, and re-plans a navigation route based on the virtual wall. For example, the moving direction of the robot is changed at a threshold distance from the virtual wall. The threshold distance is, for example, 1-5 cm.

For example, after the processing device in the cleaning robot identifies the entanglement-type obstacle, in combination with information such as its size, and/or position thereof, the processing device transmits a control instruction to the movement device to control the autonomous cleaning robot not to move according to an original movement route, so as to avoid contacting with the entanglement-type obstacle, and the area where the entanglement-type obstacle is located will not be cleaned to ensure that the autonomous cleaning robot is not entangled by the entanglement-type obstacle which results in situation such as the autonomous cleaning robot cannot move, cannot work or falls to the ground, etc.

For a mobile robot with strong driving force or with certain protection capability, it is determined to control the mobile robot to change or not to change the planned navigation route based on the contour width of the identified entanglement-type target obstacle, the height of the space it occupies, and the like.

The control strategy for the entanglement type further includes a control strategy for preventing the entanglement-type target obstacle from hindering an operational behavior of the mobile robot.

Taking a mobile robot as an autonomous cleaning robot as an example, step S130 further includes: determining to control the mobile robot not to change the planned navigation route, and controlling the working state of at least one of a side brush, a roller brush and a fan in the mobile robot to be changed during passing the target obstacle. The change of the working state includes: changing the side brush and/or the roller brush from rotation to stop; and changing the fan from a large-suction working state to a small-suction working state or to a stop-operation state.

For example, the autonomous cleaning robot controls its side brush, roller brush and fan to be in a non-working state during passing the target obstacle based on the preset movement route. As another example, during the autonomous cleaning robot passes the entanglement-type obstacle according to the preset movement route, the processing device, based on the contour width, the height and the like, reduces the rotating speed of the side brush or the roller brush or reduce the power of the fan, or control one or two of its side brush, roller brush and fan to be in a non-working state.

In some embodiments, the autonomous cleaning robot further includes an alarm device, which is connected with the processing device and used for emitting an alarm information when the processing device identifies an entanglement-type obstacle in the image. With the alarm device, information of discovering an entanglement-type obstacle can be immediately emitted for subsequent removal of the corresponding obstacle by the operator.

In the case where the obtained obstacle type is an island type, the mobile robot is controlled to bypass the corresponding target obstacle based on a relative positional relationship between the corresponding target obstacle and the mobile robot. Taking a mobile robot as an autonomous cleaning robot as an example, when the autonomous cleaning robot identifies that the obstacle type is an island type, the processing device adjusts the movement route according to the space occupied by the target obstacle, so that the autonomous cleaning robot bypasses the target obstacle and its side brush does not contact the target obstacle.

In the case where the obtained obstacle type is a space separation type, controlling the mobile robot to slow down when being close to the target obstacle until contact with the target obstacle, based on a relative positional relationship between the corresponding target obstacle and the mobile robot. Taking a mobile robot as an autonomous cleaning robot as an example, in the case where the autonomous cleaning robot identifies that the obstacle type is a space separation type, when spaced from the corresponding target obstacle by a threshold distance, the processing device controls it to move at a decelerating speed until obtaining a contact signal fed back from a collision sensor, and change the moving direction, thereby cleaning the wall edges and corners.

Figure 8:
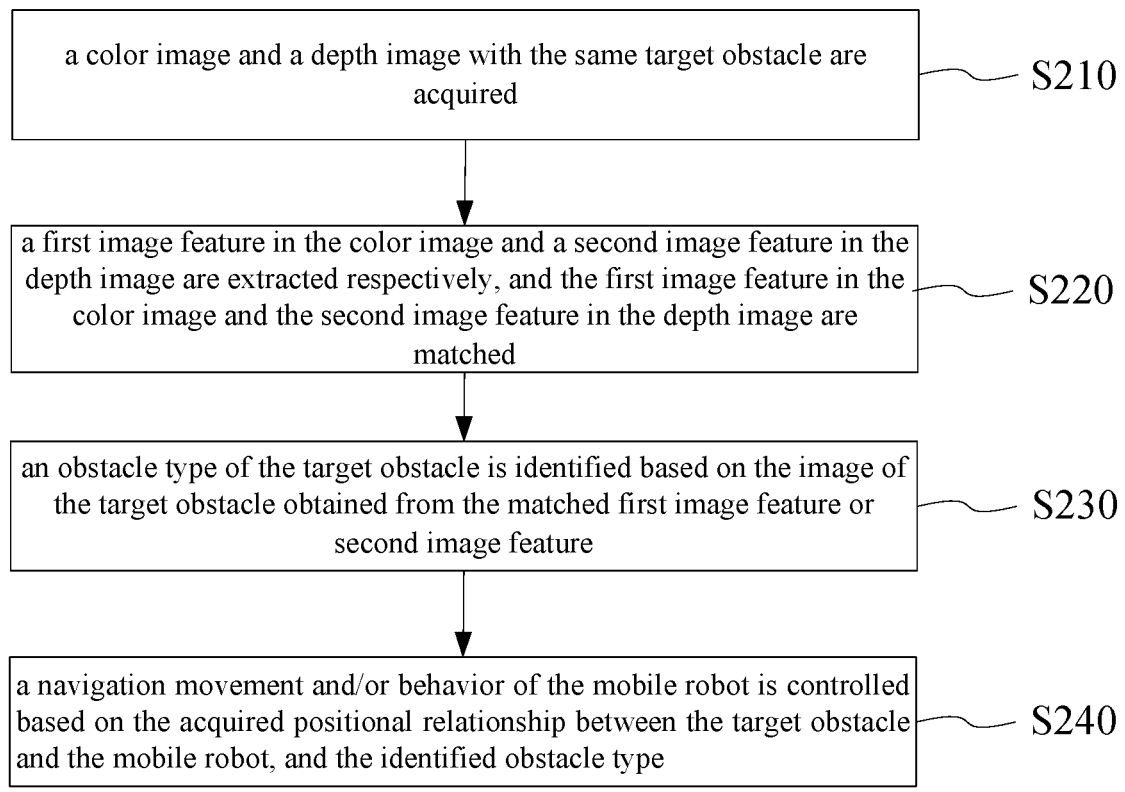
FIG. 8 shows a flow diagram of a control method of the present application in another embodiment.

To improve the accuracy of identifying the type of the target obstacle, referring to FIG. 8, which shows a flow diagram of the control method in still another embodiment, the control system executes the following steps:

In step S210, a color image and a depth image with the same target obstacle are acquired. The color image is a grayscale image or a RGB image. The color image can be obtained from an image acquisition device with a depth sensor built therein. Alternatively, the color image can be obtained from a separate monocular image acquisition device or a binocular image acquisition device. The depth image is obtained by using any of the methods provided in the foregoing examples of step S110.

Figure 9:
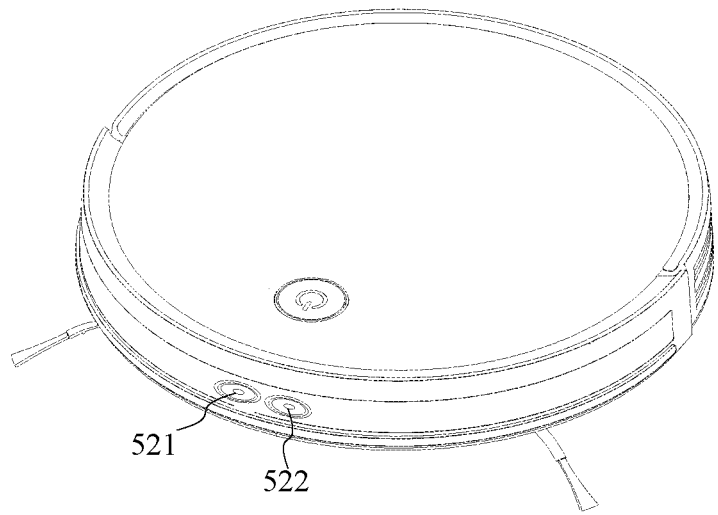
FIG. 9 shows a schematic diagram of a hardware structure of a mobile robot as an autonomous cleaning robot of the present application in still another embodiment.

The mobile robot is provided with an image acquisition device for photographing a depth image and a color image simultaneously. The top or a body side of the mobile robot is provided with an image acquisition device including an infrared photography device and an area array laser measurement device. Referring to FIG. 9, which shows a schematic diagram of a hardware structure of a mobile robot as an autonomous cleaning robot in another implementation, The image acquisition device is a ToF sensor that obtains a depth image and an infrared image according to flight time of infrared light, and the ToF sensor includes an infrared light emitter 521 and an infrared light receiver 522. The infrared receiver 522 generates a grayscale image and a depth image by using infrared light reflected by the surface of the obstacle.

The processing device identifies an obstacle type of the target obstacle based on images of the target obstacle respectively characterized by the depth image and the color image. Here, the accuracy of image identification of the target obstacle can be improved through matching image features of the same target obstacle described by different types of images.

Here, in step S220, a first image feature in the color image and a second image feature in the depth image are extracted respectively, and the first image feature in the color image and the second image feature in the depth image are matched.

Here, the manner of extracting the first image feature in the color image by the processing device is similar to the manner of extracting an image feature from the depth image described above, except that each pixel in the color image is represented by grayscale. The processing device extracts feature lines and feature points by using the discontinuity of the grayscale, and obtains the first image feature based on the extracted feature lines and feature points. The first image feature is, for example, a contour feature and/or a shape feature of the target obstacle. The processing device obtains the second image feature through the method of extracting an image feature of the target obstacle in the depth image as described above.

Matching is performed on the same type of image features described by different types of data to obtain the matched first image feature and second image feature. Here, the processing device matches the same type of contour features and/or shape features respectively described by grayscale data and depth data based on an overlapped image area in the color image and the depth image, to obtain the matched first image feature and second image feature.

Here, the processing device matches the overlapped image areas in the color image and the depth image based on the preset overlapping condition. The overlapping condition includes at least one of the following: the shortest distance between the first image feature and the second image feature in the overlapped image area is less than an error threshold, and the statistical distance of the shortest distance is less than a statistical error threshold or the like. Examples of the statistical distance include: the average, variance of the shortest distance and the like.

To reduce the computational load when matching the first image feature in the color image and the second image feature in the depth image, and improve the matching accuracy, the processing device further includes the step of determining target image areas in the color image and the depth image, wherein, the target image areas are image areas corresponding to the same field of view in the two images. Here, the processing device obtains the target image area by removing a moving plane image area from the image.

In an embodiment, the processing device determines an image area in the color image that overlaps with the target image area in the depth image as the target image area in the color image, through the aforementioned method of extracting a target image area from the depth image.

In another embodiment, the processing device determines target image areas in the color image and the depth image by using a moving plane image area preset by an assembly angle of the image acquisition device for providing the color image. Here, the manner of determining a moving plane image area in the color image is same as or similar to the aforementioned manner of determining the target image area in the depth image by using a moving plane image area preset by an assembly angle of the image acquisition device for providing the depth image. This will not be described in detail herein. The processing device determines an image area in the depth image that overlaps with the target image area in the color image as the target image area in the depth image, by using the obtained moving plane image area in the color image.

In yet another implementation, the processing device identifies a moving plane feature in the color image, and determines target image areas in the color image and the depth image based on the identified moving plane feature. The manner of identifying a moving plane feature in the color image by the processing device includes, but is not limited to, identifying the color image by using a preset moving plane feature template to obtain a moving plane image area, and/or identifying the color image by using a grayscale feature such as an overexposed area or an underexposed area presented in the color image due to light radiation on the moving plane to obtain a moving plane image area. The overexposed area is an area in the color image in which the grayscale in the image is lower than a lower limit of a preset grayscale threshold due to too strong incident light radiation. The underexposed area is an area in the color image in which the grayscale in the image is higher than an upper limit of the preset grayscale threshold due to too weak incident light radiation.

Taking a mobile robot being provided with a ToF camera on a body side thereof as an example, the ToF camera has an infrared light emitter built therein. When the mobile robot moves on a wooden or tiled floor, a color image it photographs includes an area with a grayscale lower than a lower limit of a grayscale threshold, and the processing device determines the area as a moving plane image area in the color image, and determines target image areas in the color image and the depth image based on the determined moving plane image area.

The processing devices determines that a first image feature of the target image area in the color image and a second image feature of the target image area in the depth image are matched, according to a preset overlapping condition.

Here, the manner of matching image features of the target image areas in the two images is same as or similar to the aforementioned manner of matching image features in two images, and will not be described in detail herein. It should be noted that misidentification of non-obstacles such as patterns on carpets and floor tiles can be effectively reduced through describing image features of the same target obstacle by two different types of pixel data. For example, an image feature of pattern on floor tiles is easy to extract from a color image, but cannot be extracted from a depth image due to the lack of discontinuity in depth, and such misidentification can be avoided through matching the two types of image features by an overlapping condition.

In step S230, an obstacle type of the target obstacle is identified based on the image of the target obstacle obtained from the matched first image feature or second image feature.

The image of the target obstacle is described by the corresponding first image feature or second image feature. The processing device determines the obstacle type of the corresponding target obstacle by identifying the image feature in one of the images.

Here, the manner of identifying the obstacle type by the processing device based on the second image feature in the depth image has been exemplified above and will not be described in detail herein.

The manner of identifying the obstacle type by the processing device based on the first image feature in the color image is similar to the manner of identifying the obstacle type based on the second image feature in the depth image, except that the first image feature is a contour feature and/or shape feature of the target obstacle described by grayscale data, and the obstacle type of the target obstacle described by the first image feature is determined through a manner for identifying an obstacle type by using the corresponding grayscale data. A skilled person can obtain the manner of identifying the obstacle type by using the corresponding grayscale data according to the foregoing method for identifying by using the depth data, and it will not be described in detail herein.

Taking an example of identifying an entanglement type based on a contour feature characterized by the matched first image feature, the processing device performs a statistics on contour width and/or height for the contour feature of the target obstacle; and determines that the obstacle type of the target obstacle is an entanglement type when a statistical result for the contour width and/or height conforms to a preset third entanglement condition. The third entanglement condition can be same as or similar to the aforementioned first entanglement condition.

Here, the third entanglement condition can also be used when identification is performed based on a contour feature characterized by the matched second image feature. It will not be repeated herein.

Taking an example of identifying an entanglement type based on a shape feature characterized by the matched first image feature, the processing device analyzes a curve shape feature of the target obstacle obtained through fitting based on a preset fourth entanglement condition; and determines the obstacle type of the target obstacle is an entanglement type according to the analyzed result. The fourth entanglement condition can be same as or similar to the aforementioned second condition.

Here, the fourth entanglement condition can also be used when identification is performed based on a shape feature characterized by the matched second image feature. It will not be repeated herein.

To reduce the probability of misidentification, the matched first image feature or second image feature can be pre-processed when the entanglement type is identified based on the matched first image feature or second image feature. For example, straight line feature in the first image feature or the second image feature is filtered out. The straight line includes: contour line whose length is greater than a preset length threshold, and whose curvature is less than a preset curvature threshold.

After the step S210 is performed, the processing device can further perform steps S250 (not shown) and S240. In step S250, classification is performed on an image area occupied by the matched first image feature or second image feature by a classifier trained through machine learning to obtain an obstacle type of the target obstacle in the image area. The image of the target obstacle obtained based on the matched first image feature or second image feature can be regarded as an image area occupied by the matched first image feature or second image feature is contained in the color image or the depth image.

The training and use of the classifier are the same as or similar to the training and use of the classifier designed for the depth image described above, and will not be described in detail herein.

When the obstacle type in the captured image is obtained by using any of the above examples, a positional relationship between the target obstacle of the obstacle type and the mobile robot is obtained, and step S240 is performed. The aforementioned positional relationship includes a plurality of sets of distance and angle between a space occupied by the target obstacle and a space occupied by the mobile.

In step S240, a navigation movement and/or behavior of the mobile robot is controlled based on the acquired positional relationship between the target obstacle and the mobile robot, and the identified obstacle type.

The control manner in step S240 is same as or similar to that in step S130 in the example of FIG. 2, and will not be described in detail herein.

In an embodiment, the processing device can also mark the identified obstacle type at the location of the target obstacle in a map constructed in advance, based on the acquired positional relationship between the target obstacle and the mobile robot and the identified obstacle type, to generate a map marked with the obstacle type. The map can be used for interaction between the mobile robot and a human. For example, the mobile robot transmits the map marked with the obstacle type to user equipment, so that the user acts on the target obstacle at corresponding location based on the map, such as removing the target obstacle. As another example, the mobile robot transmits the map marked with the obstacle type to user equipment, so that the user confirms and/or corrects the obstacle type. The map constructed in advance includes, but is not limited to, a map constructed based on SLAM technology, or a map constructed based on site planning, etc.

Figure 10:
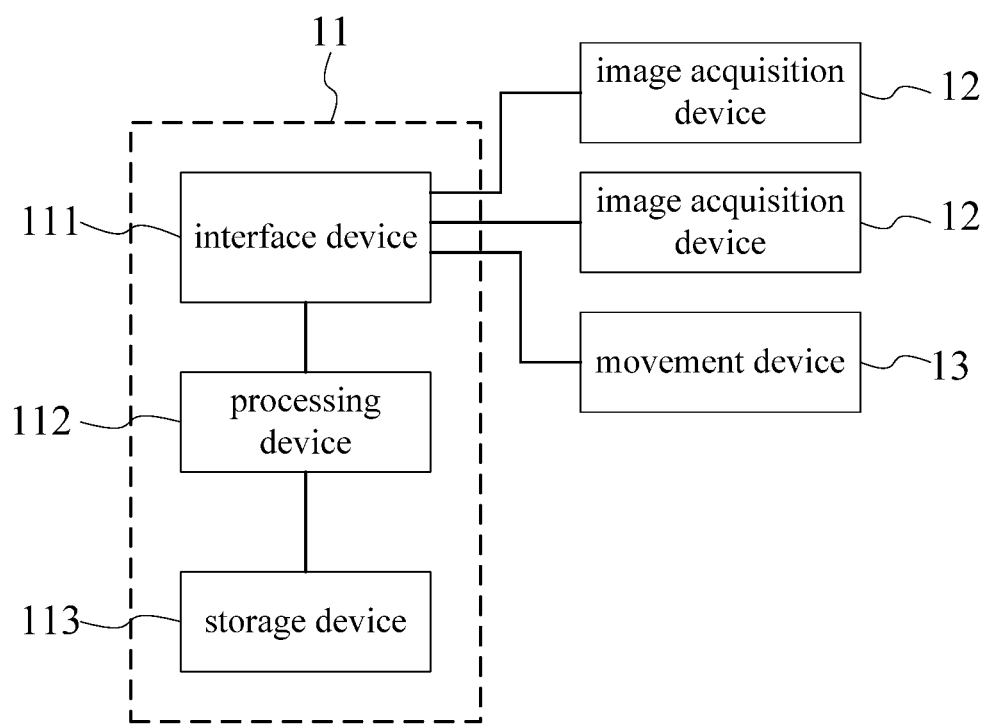
FIG. 10 shows a structure diagram of a mobile robot of the present application in an embodiment.

The present application also discloses a mobile robot. Referring to FIG. 10, which shows a structure diagram of a mobile robot of the present application in an embodiment, as shown, the mobile robot includes a storage device 113, an image acquisition device 12, a processing. device 112 and a movement device 13.

The storage device 113 and the processing device 112 may correspond to the storage device and the processing device in the aforementioned control system, and will not be described in detail herein. The processing device is connected with the image acquisition device and the movement device via an interface device 111 in the control system.

There may be at least one image acquisition device 12, the image acquisition device 12 is configured to capture at least one image with a target obstacle. The image acquisition device 12 includes, but is not limited to, a camera, a video camera, a camera module integrated with an optical system or a CCD chip, a camera module integrated with an optical system and a CMOS chip, an image acquisition device with a depth sensor built therein, a binocular image acquisition device, and the aforementioned other image acquisition devices, etc. The image acquisition device can be assembled on a top or body side of the mobile robot, as shown in FIGS. 3, 4, 5, and 8 and corresponding description thereof, and it will not be described in detail herein.

The movement device 13 is connected with the processing device 112, and is configured to perform a moving operation in a controlled manner. In a practical implementation, the movement device can include a traveling mechanism and a driving mechanism, wherein the traveling mechanism can be disposed at the bottom of the mobile robot, and the driving mechanism is built in a housing of the mobile robot. Further, the traveling mechanism can be in the form of a traveling wheel. In an implementation, the traveling mechanism can include, for example, at least two universal traveling wheels, and the at least two universal traveling wheels achieve forward, backward, steering, and rotation movement, etc. In other implementations, the traveling mechanism can, for example, include a combination of two straight traveling wheels and at least one auxiliary steering wheel, wherein in the case where the at least one auxiliary steering wheel is not involved, the two straight traveling wheels are mainly used for forward and backward movements, and in the case where the at least one auxiliary steering wheel is involved and cooperates with the two straight traveling wheels, movement such as steering and rotation can be achieved. The driving mechanism can be, for example, a drive motor, which can drive the traveling wheels in the traveling mechanism to move. In a specific implementation, the drive motor can be, for example, a reversible drive motor, and a transmission mechanism can be further provided between the drive motor and an axle of the traveling wheels.

Taking an example of acquiring by the processing device a depth image and a grayscale image provided by a ToF image acquisition device, a working process of the mobile robot is as follows: the processing device detects an overexposed area in the grayscale image and removes the overexposed area in the depth image and the grayscale image based on the detection result to obtain a target image area. The processing device respectively extracts feature lines and feature points in the target image area of the depth image and in the target image area of the grayscale image, and constructs a respective first image feature and second image feature, wherein the first image feature and the second image feature respectively describe a contour feature and a shape feature of the respectively identified target obstacle. The processing device matches the two image features to retain the overlapped first image feature and second image feature; performs a statistic on a contour width and/or height for a contour feature in the matched first image feature, and when the statistical contour width and/or height result satisfies a first entanglement condition, determines that the target obstacle described by the first image feature is an entanglement type; detects a shape feature in the matched first image feature, and if it conforms to a preset straight line feature and rectangular feature, determines the target obstacle described by the first image feature is a space separation type; and detects a contour feature in the matched second image feature, and if it conforms to a preset closed contour occupied space, determines that the target obstacle described by the second image feature is an island type. The processing device transmits a movement control instruction including a direction and a moving distance, or including a direction and a moving speed, to the movement device according to the obtained obstacle type and positional relationship between the obstacle and the mobile robot, so that the movement device drives the mobile robot to move as a whole according to the movement control instruction.

Figure 11:
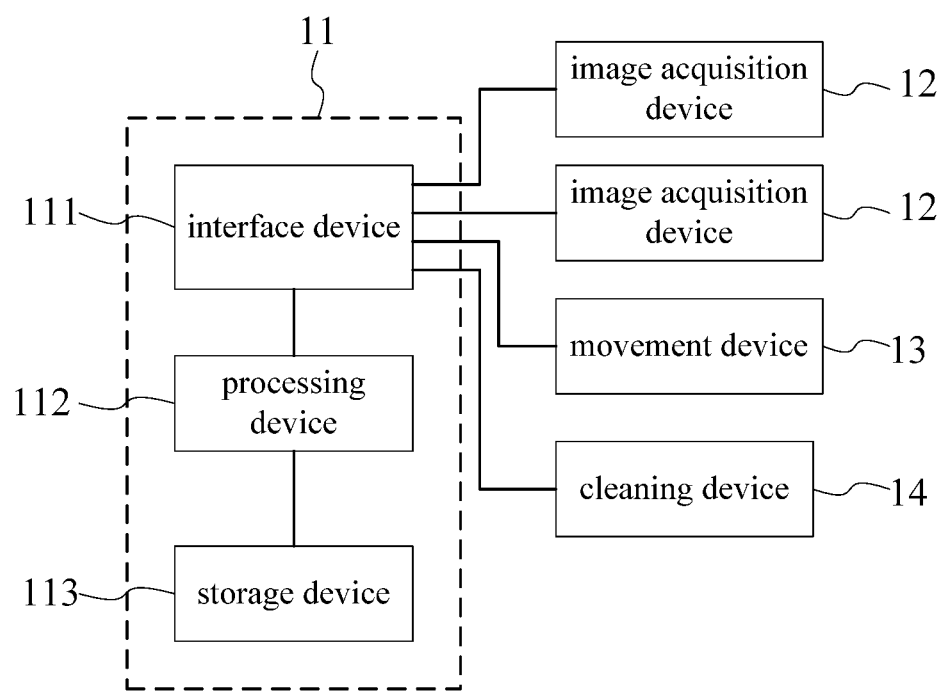
FIG. 11 shows a structure diagram of an autonomous cleaning robot of the present application in an embodiment.

The present application also discloses an autonomous cleaning robot. Referring to FIG. 11, which shows a structure diagram of an autonomous cleaning robot of the present application in an embodiment, as shown, the autonomous cleaning robot includes a storage device 113 and an image acquisition device 12, a processing device 112, a cleaning device 14, and a movement device 13.

The structures of the storage device 113, the image acquisition device 121, the processing device 112, and the movement device 13 correspond to the devices shown in the aforementioned FIG. 10 and corresponding description thereof, and are not repeated herein.

The cleaning device 14 is configured to perform a cleaning operation in a controlled mode. The cleaning device 25 includes at least one of a side brush, a roller brush, and a fan. The cleaning device 14 is connected with the processing device 112 through an interface device 111, and is used for performing a cleaning operation on the ground based on a control instruction transmitted by the processing device 112 during the autonomous cleaning robot moves.

In an embodiment, the cleaning device 14 is connected with the processing device, and is used for performing a cleaning operation on the ground based on a control instruction transmitted by the processing device when the autonomous cleaning robot moves. In a practical implementation, the cleaning device can at least include a cleaning assembly and a dust suction assembly. The cleaning assembly can include a side brush and a roller brush at the bottom of a housing, and a side brush motor for controlling the side brush and a roller brush motor for controlling the roller brush, wherein there may be at least two side brushes which are symmetrically disposed on opposite sides of a front end of the housing respectively, and the side brush can be a rotary side brush that can be controlled by the side brush motor to rotate. The roller brush is located at the middle of the bottom of the autonomous cleaning robot, and can be rotated for a cleaning operation under the control of the roller brush motor to sweep in rubbish from the cleaned ground and transport it into the dust suction assembly through a collection inlet. The dust suction assembly can include a dust collecting chamber and a fan, wherein the dust collecting chamber is placed in the housing, and the fan is configured to provide a suction force to suck rubbish into the dust collecting chamber. The cleaning device is not limited thereto, and in other implementations, the cleaning device can further include, for example, a mopping device. The cleaning device is also, for example, as described in embodiments provided in Chinese Patent CN109363571A and CN109330504A, etc. As another example, the cleaning device can further include a spray device or a sprinkle device, such as in embodiments provided in Chinese Patent CN109363587A. Here, the entire contents of the Chinese patents CN109363571A, CN109330504A, and CN109363587A are hereby incorporated by reference.

Taking an example of acquiring by the processing device a depth image and a grayscale image provided by a ToF image acquisition device, a working process of the mobile robot is as follows: the processing device detects an overexposed area in the grayscale image and removes the overexposed area in the depth image and the grayscale image based on the detection result to obtain a target image area. The processing device respectively extracts feature lines and feature points in the target image area of the depth image and in the target image area of the grayscale image, and constructs a respective first image feature and second image feature, wherein the first image feature and the second image feature respectively describe a contour feature and a shape feature of the respectively identified target obstacle. The processing device matches the two image features to retain the overlapped first image feature and second image feature; performs a statistic on a contour width and/or height for a contour feature in the matched first image feature, and when the statistical contour width and/or height result satisfies a first entanglement condition, determines that the target obstacle described by the first image feature is an entanglement type; and transmits a movement control instruction including a direction and a moving distance to the movement device according to the obtained obstacle type and positional relationship between the obstacle and the mobile robot, and when determining that the target obstacle is reached according to a moving distance and a moving direction fed back by the movement device, the processing device controls the fan, the side brush and the roller brush to stop working, until it is determined that the target obstacle has been passed.

The processing device detects a shape feature in the matched first image feature, and if it conforms to a preset straight line feature and rectangular feature, determines the target obstacle described by the first image feature is a space separation type; and detects a contour feature in the matched second image feature, and if it conforms to a preset closed contour occupied space, determines that the target obstacle described by the second image feature is an island type. The processing device transmits a movement control instruction including a direction and a moving distance, or including a direction and a moving speed, to the movement device according to the obtained obstacle type and positional relationship between the obstacle and the mobile robot, so that the movement device drives the mobile robot to move as a whole according to the movement control instruction.

The present application also provides a computer readable storage medium which is configured to store at least one program, when the program is invoked, any of the control methods described above is performed.

In addition, it should also be noted that, through the description of the above implementations, those skilled in the art can clearly understand that part or all of the present application can be realized by means of software and in combination with necessary general-purpose hardware platforms. Based on this, the present application further provides a storage medium of an computer apparatus, the storage medium stores at least one program, and when the program are executed by processor, the control method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

The invention claimed is:

1. A mobile robot, comprising:
   at least one image acquisition device, configured to capture at least one image with a target obstacle;
   a movement device, configured to perform a moving operation in a controlled manner;
   a storage device, configured to store at least one program;
   a processing device, connected with the movement device, the storage device and the image acquisition device, and configured to invoke and execute the at least one program to coordinate the movement device, the storage device and the image acquisition device to perform and realize a control method as follows:
   acquiring a depth image obtained through photography of the at least one image acquisition device; wherein, the depth image contains a depth image of the target obstacle;
   determining a target image area in the depth image by at least one of the following steps: identifying a moving plane feature in the depth image and determining the target image area in the depth image based on the moving plane feature, wherein, the moving plane feature refers to a feature used to characterize a moving plane of the mobile robot in the depth image, the target image area is an image area formed by remaining features in the depth image left after the identified moving plane features are removed from the depth image; determining the target image area in the depth image based on a moving plane image area, wherein, the moving plane image area is preset based on an assembly angle of the image acquisition device, the target image area is an image area formed by filtering out the moving plane image area in the depth image; wherein the image of the target obstacle is located in the target image area;
   identifying an obstacle type of the target obstacle from the target image area in the depth image;
   controlling a navigation movement and/or behavior of the mobile robot based on an acquired positional relationship between the target obstacle and the mobile robot, and the identified obstacle type.

2. The mobile robot of claim 1, wherein, the step of acquiring a depth image obtained through photography of the at least one image acquisition device comprises the following step:
   acquiring the depth image from an image acquisition device with a built-in depth sensor; or
   obtaining the depth image based on two color images captured by at least one image acquisition device, the two color images contain an overlapping area.

3. The mobile robot of claim 1, wherein, the step of identifying an obstacle type of the target obstacle from the depth image comprises at least one of the following steps:
   identifying an image feature of the target obstacle in the depth image, and determining the obstacle type according to the identified image feature of the target obstacle;

performing obstacle classification on the depth image by a classifier trained through machine learning to obtain the obstacle type of the target obstacle characterized by the depth image.

4. The mobile robot of claim 3, wherein, the image feature comprises a contour feature and/or a shape feature.

5. The mobile robot of claim 4, wherein, the step of determining the obstacle type according to the identified contour feature of the target obstacle comprises:
performing a statistic on width and/or height for the contour feature of the target obstacle;
determining that the obstacle type of the target obstacle is an entanglement type when the contour width and/or height conform(s) to a preset first entanglement condition.

6. The mobile robot of claim 4, wherein, the step of determining the obstacle type according to the identified shape feature of the target obstacle comprises:
analyzing a curve shape feature of the target obstacle obtained through fitting based on a preset second entanglement condition;
determining that the obstacle type of the target obstacle is an entanglement type according to the analyzed result.

7. The mobile robot of claim 1, wherein, the processing device further configured to perform a step of acquiring a color image with the same target obstacle;
the step of identifying an obstacle type of the target obstacle from the depth image comprises: identifying the obstacle type of the target obstacle based on the image of the target obstacle characterized by the depth image and an image of the target obstacle characterized by the color image.

8. The mobile robot of claim 7, wherein, the step of identifying the obstacle type of the target obstacle based on the image of the target obstacle characterized by the depth image and an image of the target obstacle characterized by the color image comprises:
matching a first image feature in the color image and a second image feature in the depth image;
identifying the obstacle type of the target obstacle based on the image of the target obstacle obtained from the matched first image feature or second image feature.

9. The mobile robot of claim 8, wherein, the processing device further configured to perform at least one of the following steps of obtaining target image areas in the color image and the depth image, to perform the matching operation in the target image areas:
determining target image areas in the color image and the depth image based on a moving plane image area, the moving plane image area is preset based on an assembly angle of the image acquisition device;
identifying a moving plane feature in the color image or/and the depth image, and determining target image areas in the color image and the depth image based on the identified moving plane feature.

10. The mobile robot of claim 8, wherein, the step of matching a first image feature in the color image and a second image feature in the depth image comprises:
determining the first image feature in the color image and the second image feature in the depth image are matched according to a preset overlapping condition.

11. The mobile robot of claim 8, wherein, the step of identifying the obstacle type of the target obstacle based on the image of the target obstacle obtained from the matched first image feature or second image feature comprises at least one of the following steps:

identifying the obstacle type of the target obstacle based on a contour feature of the target obstacle characterized by the matched first image feature or second image feature;
identifying the obstacle type of the target obstacle based on a shape feature of the target obstacle characterized by the matched first image feature or second image feature;
performing classification on an image area occupied by the matched first image feature or second image feature by a classifier trained through machine learning to obtain the obstacle type of the target obstacle in the image area.

12. The mobile robot of claim 11, wherein, the step of identifying the obstacle type of the target obstacle based on a contour feature of the target obstacle characterized by the matched first image feature or second image feature comprises:
performing a statistic on contour width and/or height for the contour feature of the target obstacle;
determining that the obstacle type of the target obstacle is an entanglement type when a statistical result for the contour width and/or height conforms to a preset third entanglement condition.

13. The mobile robot of claim 11, wherein, the step of identifying the obstacle type of the target obstacle based on a shape feature of the target obstacle characterized by the matched first image feature or second image feature comprises:
analyzing a curve shape feature of the target obstacle obtained through fitting based on a preset fourth entanglement condition;
determining that the obstacle type of the target obstacle is an entanglement type according to the analyzed result.

14. The mobile robot of claim 1, wherein, the obstacle type includes at least one of an entanglement type, an island type, and a space separation type.

15. The mobile robot of claim 1, wherein, the step of controlling a navigation movement and/or behavior of the mobile robot based on an acquired positional relationship between the target obstacle and the mobile robot, and the identified obstacle type comprises at least one of the following steps:
in the case where the obtained obstacle type is an entanglement type, controlling the mobile robot to change its moving direction when being close to the target obstacle;
in the case where the obtained obstacle type is an island type, controlling the mobile robot to bypass a corresponding target obstacle based on a relative positional relationship between the corresponding target obstacle and the mobile robot;
in the case where the obtained obstacle type is a space separation type, controlling the mobile robot to slow down when being close to the target obstacle until contact with the target obstacle based on a relative positional relationship between the target obstacle and the mobile robot.

16. The mobile robot of claim 1, wherein, the mobile robot is an autonomous cleaning robot.

17. The mobile robot of claim 16, wherein, the step of controlling a navigation movement and/or behavior of the mobile robot based on an acquired positional relationship between the target obstacle and the mobile robot, and the identified obstacle type further comprises:

in the case where the obtained obstacle type is an entanglement type, controlling the mobile robot to pass the target obstacle according to a preset movement route; and controlling a working state of at least one of a side brush, a roller brush and a fan in the mobile robot to be changed during passing the target obstacle.

18. A control method for a mobile robot, wherein, the mobile robot comprises at least one image acquisition device, the control method comprises the following steps:

acquiring a depth image obtained through photography of the at least one image acquisition device; wherein, the depth image contains a depth image of the target obstacle;

determining a target image area in the depth image by at least one of the following steps: identifying a moving plane feature in the depth image and determining the target image area in the depth image based on the moving plane feature, wherein, the moving plane feature refers to a feature used to characterize a moving plane of the mobile robot in the depth image, the target image area is an image area formed by remaining features in the depth image left after the identified moving plane features are removed from the depth image; determining the target image area in the depth image based on a moving plane image area, wherein, the moving plane image area is preset based on an assembly angle of the image acquisition device, the target image area is an image area formed by filtering out the moving plane image area in the depth image; wherein the image of the target obstacle is located in the target image area;

identifying an obstacle type of the target obstacle from the target image area in the depth image;

controlling a navigation movement and/or behavior of the mobile robot based on an acquired positional relationship between the target obstacle and the mobile robot, and the identified obstacle type.

19. A control system for a mobile robot, wherein, the mobile robot is provided with at least one image acquisition device, the control system comprises:

an interface device, configured to receive an image captured by the at least one image acquisition device;

a storage device, configured to store at least one program;

a processing device, connected with the interface device and the storage device, and configured to invoke and execute the at least one program to coordinate the interface device, the storage device and the image acquisition device to perform and realize a control method as follows:

acquiring a depth image obtained through photography of the at least one image acquisition device; wherein, the depth image contains a depth image of the target obstacle;

determining a target image area in the depth image by at least one of the following steps: identifying a moving plane feature in the depth image and determining the target image area in the depth image based on the moving plane feature, wherein, the moving plane feature refers to a feature used to characterize a moving plane of the mobile robot in the depth image, the target image area is an image area formed by remaining features in the depth image left after the identified moving plane features are removed from the depth image; determining the target image area in the depth image based on a moving plane image area, wherein, the moving plane image area is preset based on an assembly angle of the image acquisition device, the target image area is an image area formed by filtering out the moving plane image area in the depth image; wherein the image of the target obstacle is located in the target image area;

identifying an obstacle type of the target obstacle from the target image area in the depth image;

controlling a navigation movement and/or behavior of the mobile robot based on an acquired positional relationship between the target obstacle and the mobile robot, and the identified obstacle type.

* * * * *

UNITED STATES PATENT AND TRADEMARK OFFICE
CERTIFICATE OF CORRECTION

| | |
|---|---|
| PATENT NO. | : 11,042,760 B2 |
| APPLICATION NO. | : 15/929934 |
| DATED | : June 22, 2021 |
| INVENTOR(S) | : Yuwei Cui et al. |

Page 1 of 1

It is certified that error appears in the above-identified patent and that said Letters Patent is hereby corrected as shown below:

On the Title Page (73); delete "ANKOBOT (SHANGHAI) SMART TECHNOLOGIES CO., LTD. Shanghai (CN)" and insert therefor -- ANKOBOT (SHENZHEN) SMART TECHNOLOGIES CO. LTD. Shenzhen (CN) ANKOBOT (SHANGHAI) SMART TECHNOLOGIES CO., LTD. Shanghai, (CN) --.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*